United States Patent [19]

Eisele et al.

[11] 4,086,878

[45] May 2, 1978

[54] COMBUSTION PROCESS FOR EXTERNALLY CONTROLLED RECIPROCATING PISTON INTERNAL COMBUSTION ENGINE OPERATING WITH HYDROGEN INJECTION

[75] Inventors: Erwin Eisele, Stuttgart; Klaus Binder, Deizisau; Klaus Drexl, Waiblingen, all of Germany

[73] Assignee: Daimler-Benz Aktiengesellschaft, Germany

[21] Appl. No.: 677,139

[22] Filed: Apr. 15, 1976

[30] Foreign Application Priority Data

Apr. 17, 1975 Germany ............................ 2517066

[51] Int. Cl.[2] ............................................. F02B 17/00

[52] U.S. Cl. ........................... 123/1 A; 123/DIG. 12; 123/32 ST

[58] Field of Search ......... 123/1 A, DIG. 12, 27 GE, 123/30 C, 30 D, 32 ST, 32 SP

[56] References Cited

U.S. PATENT DOCUMENTS

| | | | |
|---|---|---|---|
| 2,183,674 | 12/1939 | Erren | 123/27 GE |
| 2,205,493 | 6/1940 | Saurer | 123/30 C |
| 2,470,747 | 5/1949 | Shepherd | 123/27 GE X |
| 2,921,566 | 1/1960 | Meurer | 123/30 C |
| 2,982,270 | 5/1961 | Seegelken | 123/30 C |
| 3,425,399 | 2/1969 | Ward et al. | 123/27 GE X |

FOREIGN PATENT DOCUMENTS

| | | | |
|---|---|---|---|
| 831,429 | 9/1938 | France | 123/DIG. 12 |

*Primary Examiner*—Charles J. Myhre
*Assistant Examiner*—Ira S. Lazarus
*Attorney, Agent, or Firm*—Craig & Antonelli

[57] ABSTRACT

A combustion process for a reciprocating piston internal combustion engine with applied ignition and operating with hydrogen injection as well as an internal combustion engine capable of carrying out the process, in which the air is supplied independently of the hydrogen and an air ring rotating about the cylinder axis is produced which has a density increasing radially outwardly; the injection of the hydrogen into the air ring thereby takes place into the central area of the air ring while ignition takes place within the transition area between the central hydrogen core and the externally rotating air ring.

19 Claims, 2 Drawing Figures

FIG 1
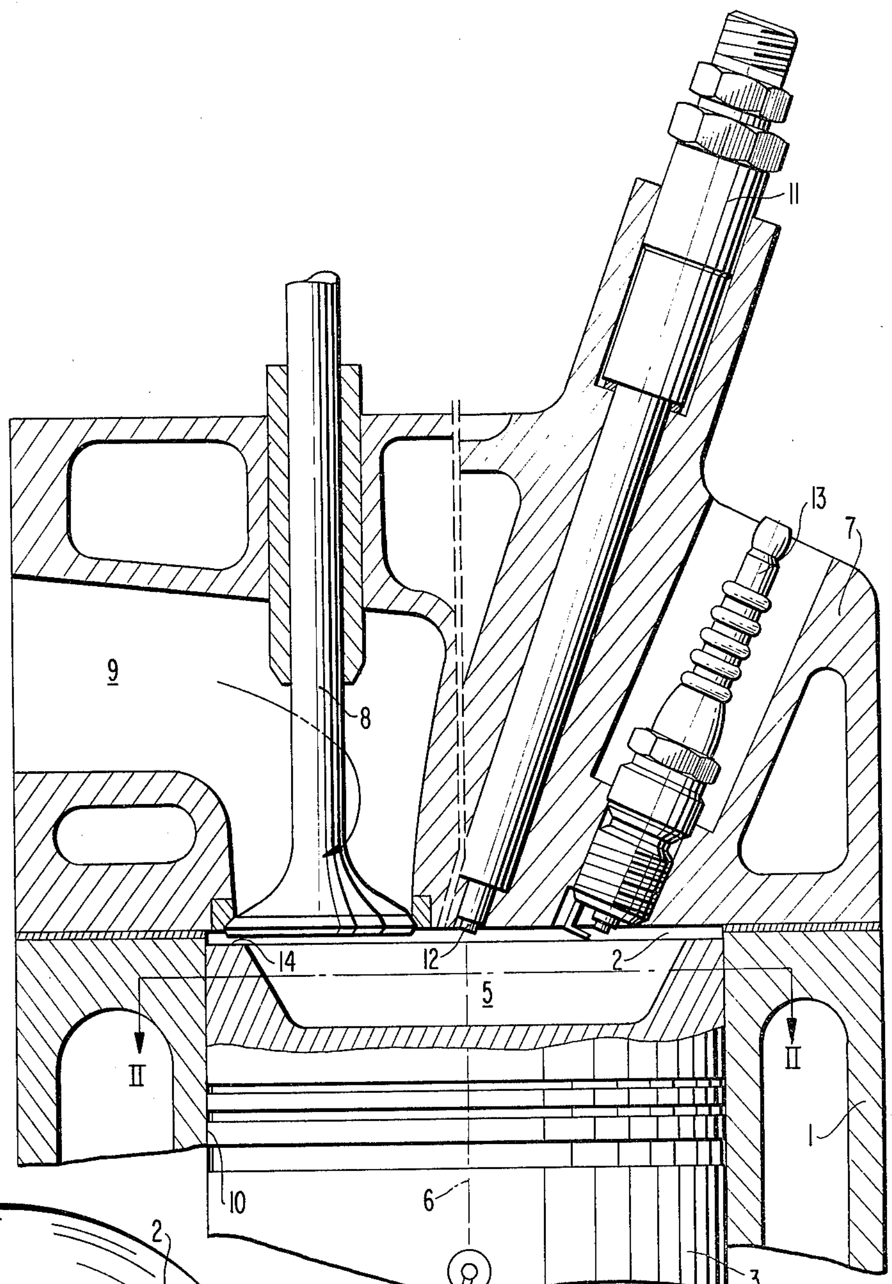
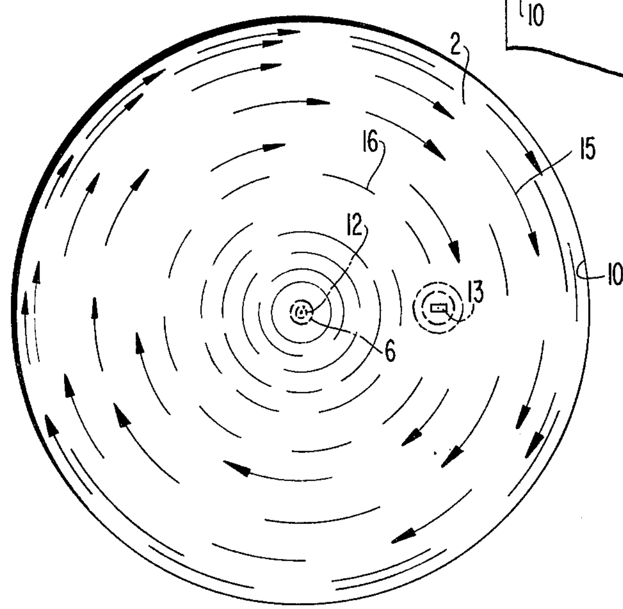
FIG 2

COMBUSTION PROCESS FOR EXTERNALLY CONTROLLED RECIPROCATING PISTON INTERNAL COMBUSTION ENGINE OPERATING WITH HYDROGEN INJECTION

The present invention relates to a combustion process for a reciprocating piston internal combustion engine with applied ignition and operating with hydrogen injection, in which the air is supplied independently of the hydrogen and an air ring rotating about the cylinder axis and having a density increasing radially outwardly is being built up, into which the hydrogen is injected.

In a known combustion process of this type (British Pat. No. 462,605; U.S. Pat. No. 2,183,674), the hydrogen is injected into the rotating air ring from radially outside essentially in the direction of rotation of the air, and a particularly fast and rapid mixing between the gases is to take place by this injection of the hydrogen into the air ring in order to preclude the formation of local hydrogen cells which are supposed to have as a consequence a destruction of the engine by reason of the fact that the essentially pure hydrogen reaches the crankcase of the engine and leads thereat to destructions under explosion-like combustion.

In contradistinction thereto, the present invention starts with the recognition that a strong mixing and a rapid alternate penetration or permeation of the hydrogen with the air must not be aimed at, because the combustion of the hydrogen-air mixture takes place very suddenly and the engine is exposed to correspondingly hard, impact-like loads which must be considered as not acceptable especially already for reasons of the desired running behavior expected of a modern internal combustion engine.

Accordingly, the present invention is concerned with the task to indicate a novel approach, how for a reciprocating piston internal combustion engine with hydrogen injection, on the one hand, a reliable ignition can be attained and, on the other hand, a burning through or combustion which is as uniform as possible can be assured, as is prerequisite for a useful engine operating behavior in conjunction with an ignition at the right instant.

The underlying problems are solved according to the present invention with a combustion method of the aforementioned type in that with an injection of the hydrogen into the central area of the rotating cylinder air charge, the ignition takes place in the transition area between the central hydrogen core resulting therefrom and the externally rotating air ring. The aforementioned method according to the present invention leads to the aimed-at uniform combustion with reliable ignition at a predetermined instant because, on the one hand, the air under the influence of the mass forces occurring during the rotation is displaced essentially against the cylinder walls, in the area of which the air has the greatest density, and because, on the other, the preferably axially injected hydrogen will initially concentrate itself essentially in the axis center of the rotating air column by reason of its considerably lesser density. An ignitable mixture results in the transition area from the center hydrogen core to the outer rotating air ring by reason of the diffusion. Thus, a certain stratification is produced as a result of the method according to the present invention which prevents an immediate sudden burning-through because for the complete combustion, the alternate permeation or diffusion of hydrogen and air must take place which occurs rapidly in the further course.

Within the scope of the method according to the present invention, the rotation of the air charge in the cylinder can be achieved in that the air is sucked into the cylinder space by way of an inlet vortex or swirl channel, or also in that a deflection valve imparts a swirl to the suction air. Finally, the swirl can also be achieved by a corresponding piston construction and can be reinforced by such a construction whereby also various ones of these measures may be utilized in common in a conventional manner.

According to a feature of the present invention, the hydrogen injection may commence already during the suction stroke, and more particularly after exhaust closure. An injection beginning which occurs so early may prove as appropriate in order to have to inject the hydrogen with only slight excess pressure so that the feed efficiency losses which have to be accepted with such an early injection, are again compensated for at least in part by the lower required injection pressure.

However, it is also possible within the scope of the present invention to displace the beginning of the hydrogen injection into the early compression stroke, thus in particular to commence the injection after inlet closure, whence such a feed efficiency loss is avoided, but a higher injection pressure is required. However, the injection pressure remains altogether still relatively low since the injection need not continue up to the upper dead-center point or even into the combustion. Thus, the beginning of the hydrogen injection may take place between exhaust closure and about 60° prior to the upper dead-center position, in which takes place the transition from compression to the expansion. Within the scope of the method according to the present invention, the quantity control for the injected hydrogen may also take place in a conventional manner by changing the injection periods and/or by changing the injection pressure.

In particular, an arrangement of the injection nozzle which is as central as possible proves as appropriate for a reciprocating piston internal combustion engine used for carrying out the method of the present invention, and the distance of the injection nozzle from the cylinder axis should correspond within the scope of the present invention maximum to half the cylinder radius.

With respect to the arrangements of the injection nozzle to the ignition source, it has proved as appropriate if the ignition source is arranged at a relatively larger radial distance from the cylinder axis as compared to the distance of the injection nozzle. Preferably spark plugs, possibly in their construction as slide-spark or creepage-spark plugs, spark plugs with follower-sparks or the like are used as the ignition source.

Accordingly, it is an object of the present invention to provide a combustion method for a reciprocating piston internal combustion engine with applied ignition and hydrogen injection which avoids by simple means the aforementioned shortcomings and drawbacks encountered in the prior art.

Another object of the present invention resides in a combustion method for a reciprocating piston internal combustion engine with applied ignition and hydrogen injection and in an internal combustion engine capable of carrying out this combustion method, in which as uniform as possible a combustion is assured together with reliable ignition.

A further object of the present invention resides in a combustion process for a reciprocating piston internal combustion engine with applied ignition and hydrogen injection which insures a smooth operation of the engine under all conditions and avoids any hard running of the engine.

A still further object of the present invention resides in a combustion method for an internal combustion engine of the type described above in which excessive loads and stresses are avoided notwithstanding the use of hydrogen injection.

These and other objects, features and advantages of the present invention will become more apparent from the following description when taken in connection with the accompanying drawing which shows, for purposes of illustration only, one embodiment in accordance with the present invention and wherein:

FIG. 1 is a partial cross-sectional view through the cylinder head area of a reciprocating piston internal combustion engine operating with hydrogen injection, whereby in two mutually independent cross sections, on the one hand, an inlet valve with coordinated swirl channel is shown and, on the other hand, the arrangement of the injection nozzle and the ignition source is shown; and FIG. 2 is a cross-sectional view taken along line II—II in FIG. 1 whereby the injection nozzle and ignition source are indicated as regards their position and whereby additionally the resulting stratification between hydrogen and air are schematically indicated.

Referring now to the drawing wherein like reference numerals are used throughout the two views to designate like parts, reference numeral 1 designates in FIG. 1 the cylinder block, which is provided with a bore 2 in which is arranged a piston 3; the piston 3 is connected by way of a connecting rod 4 only schematically indicated with the crankshaft (not shown) of the engine in a conventional manner. The piston 3 is provided with a piston recess 5 which is constructed symmetrically to the cylinder axis 6 and which forms a part of the compression space that is delimited in the upward direction by the cylinder head 7.

In addition to at least one exhaust valve (not shown), one inlet valve 8 is arranged in the cylinder head 7, to which is coordinated an inlet channel 9 which is constructed as swirl channel so that air sucked in by way of the inlet channel 9 and the inlet valve 8 carries out a rotary movement rotating about the cylinder axis 6, i.e., a rotating or swirling air ring results which by reason of the mass forces occurring during the rotation has its greatest density within the area of the walls of the bore 2, i.e., within the area of the cylinder wall 10. The valve 8 may be actuated in a conventional manner not shown in detail herein.

In the illustrated embodiment, an injection nozzle 11 for the hydrogen is additionally provided, to which the hydrogen is fed in a conventional manner (not shown) and which discharges centrally in the direction toward the bore 2. The discharge opening 12 of the injection nozzle 11 thereby lies in the illustrated embodiment on the cylinder axis 6. A spark plug 13 is arranged radially outwardly as ignition source, and more particularly, as can be seen from FIG. 2, in such a manner that the ignition is undertaken in the transition area between air and hydrogen, in which the alternate permeation or diffusion and the mixing of air and hydrogen essentially takes place.

The rotation of the air ring is enhanced in the illustrated embodiment by the piston shape (piston recess 5) and the squeeze gap 14 provided in the transition between the recess 5 and the outer rim of the piston 3.

The rotating air ring with its density increasing radially outwardly is symbolically indicated in FIG. 2 by the arrows 15 whereas the centrally injected hydrogen is indicated as initially essentially stationary core 16.

FIG. 2 thus illustrates the principle according to the present invention, in which air and hydrogen are strongly stratified in the cylinder by the central injection of the hydrogen and by the rotation of the air. By reason of the great diffusion willingness of the hydrogen, a mixing results in the further course which starts from the transition area between the core 16 and the outer air ring 15 whereby the ignition source 13 is arranged in this transition area, and this mixing finally also leads to a penetration and permeation of the outermost air layers with hydrogen, in which, however, only a relatively lean mixture is produced. It is assured thereby that the combustion proceeds gradually and that explosion-like combustion phenomena are precluded, and more particularly with simultaneous optimum prerequisites for a safe ignition by reason of the wide ignition limits of the air/hydrogen mixtures.

During the combustion which follows the ignition, superheated water vapor forms as main product of the combustion which in its specific weight differs only slightly from the air above all in comparison with the very light, inwardly disposed hydrogen, and mixes with the air so that the combustion is controlled in its progress above all as regards pressure increase and combustion duration by the achieved stratification.

Above all, if within the scope of the method according to the present invention the hydrogen is so applied that it strongly rotates along with the rotating air ring about the cylinder axis, the aimed-at stratification is assured by reason of the large density differences between hydrogen and air. A rapid preparation, a rapid permeation of hydrogen and water as might be desirable under certain circumstances with relatively later injection, could be achieved thereby in a simple manner in that the hydrogen is injected opposite the direction of rotation of the air.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A combustion method for a reciprocating piston internal combustion engine with applied ignition and operating with an injection of hydrogen, in which air is supplied to cylinders of the engine independently of the hydrogen, and an air ring rotating about the cylinder axis is produced which has a density that increases radially outwardly, the combustion method comprising the steps of injecting the hydrogen into a central area of the air ring, and igniting the mixture within a transition area between a central hydrogen core and an outer rotating air ring.

2. A combustion method according to claim 1, in which the hydrogen is injected essentially axially into the central area of the air ring.

3. A combustion method according to claim 1, in which the step of injecting includes beginning the hydrogen injection between an exhaust closure and about 60° prior to an upper dead-center position, in which takes place the transition from a compression to an expansion.

4. A combustion method according to claim 3, characterized in that the step of injecting includes beginning the hydrogen injection in a suction stroke of the engine.

5. A combustion method according to claim 3, characterized in that the step of injecting includes beginning the hydrogen injection after an inlet closing.

6. A combustion method according to claim 3, characterized in that the step of injecting includes beginning the hydrogen injection early in a compression stroke of the engine.

7. A combustion method according to claim 3, in which the hydrogen is injected essentially axially into the central area of the air-ring.

8. A reciprocating piston internal combustion engine with applied ignition and operating with a hydrogen injection, means for supplying air to cylinders of the engine, independently of the hydrogen, in the form of an air ring rotating essentially about a longitudinal axis of symmetry of respective cylinders, the air ring has a density that increases radially outwardly, characterized by injection means for injecting the hydrogen into a central area of the air ring so as to form a central hydrogen core in the rotating air ring, and externally controlled ignition means for igniting a hydrogen-air mixture within a transition area between the central hydrogen core and an outer rotating air ring.

9. An internal combustion engine according to claim 8, characterized in that the injection means is arranged in the engine so as to inject the hydrogen essentially axially into the central area of the air ring.

10. An internal combustion engine according to claim 8, with a cylinder head in which the injection means includes an injection nozzle which is arranged in an area of the cylinder head near the longitudinal axis of symmetry of the cylinder, characterized in that the injection nozzle is located at a distance from the longitudinal axis of symmetry of the cylinder corresponding at most to about half the cylinder radius.

11. An internal combustion engine according to claim 10, characterized in that the ignition means includes an ignition source which is arranged at a radial distance from the longitudinal axis of the cylinder corresponding at least essentially to the distance of the injection nozzle.

12. An internal combustion engine according to claim 11, characterized in that the injection nozzle is located within a center area of a cylinder and the ignition source is located at a radial distance from the injection nozzle which amounts to between one-third to two-thirds the radial length.

13. An internal combustion engine according to claim 11, characterized in that the injection means is operable to begin an injection of the hydrogen between exhaust closure and about 60° of the upper dead-center position, in which takes place a transition from a compression to an expansion.

14. An internal combustion engine according to claim 11, characterized in that the injection means is operable to commence the injection of the hydrogen during a suction stroke of the engine.

15. An internal combustion engine according to claim 11, characterized in that the injection means is operable to commence the injection of the hydrogen after an inlet closure.

16. An internal combustion engine according to claim 11, characterized in that the injection means is operable to commence the injection of the hyrogen early in a compression stroke.

17. An internal combustion engine according to claim 12, characterized in that the injection means is arranged in the engine so as to inject the hydrogen essentially axially into the central area of the air ring.

18. A combustion method for a reciprocating piston internal combustion engine operating with a hydrogen injection, means for supplying air to cylinders of the engine in the form of an air ring rotating about a longitudinal axis of symmetry of the respective cylinders, the rotating air having a density that increases radially outwardly, the method comprising the steps of:

injecting the hydrogen into a central area of the air ring so as to form a central hydrogen core in the rotating air ring, and igniting the mixture within a transition area between the central hydrogen core and an outer rotating air ring.

19. A combustion method according to claim 18, wherein the step of injecting the hydrogen includes directing the hydrogen essentially axially into the central area of the air ring.

* * * * *